(12) United States Patent
Moon et al.

(10) Patent No.: US 9,749,620 B2
(45) Date of Patent: Aug. 29, 2017

(54) DISPARITY CORRECTING DEVICE IN STEREO VISION AND METHOD THEREOF

(71) Applicant: KYUNGPOOK NATIONAL UNIVERSITY INDUSTRY—ACADEMIC COOPERATION FOUNDATION, Daegu (KR)

(72) Inventors: Byung In Moon, Daegu (KR); Kyeong Ryeol Bae, Daegu (KR)

(73) Assignee: KYUNGPOOK NATIONAL UNIVERSITY INDUSTRY—ACADEMIC COOPERATION FOUNDATION, Daegu (KR)

( * ) Notice: Subject to any disclaimer, the term of this patent is extended or adjusted under 35 U.S.C. 154(b) by 252 days.

(21) Appl. No.: 14/587,515

(22) Filed: Dec. 31, 2014

(65) Prior Publication Data

US 2016/0171677 A1 Jun. 16, 2016

(30) Foreign Application Priority Data

Dec. 16, 2014 (KR) ........................ 10-2014-0180879

(51) Int. Cl.
G06K 9/00 (2006.01)
H04N 13/04 (2006.01)
H04N 13/00 (2006.01)

(52) U.S. Cl.
CPC ..... *H04N 13/0497* (2013.01); *H04N 13/0022* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 6,215,898 B1* | 4/2001 | Woodfill | G06K 9/32 348/47 |
| 8,427,524 B2* | 4/2013 | Jeong | G06K 9/32 348/42 |
| 2012/0039525 A1* | 2/2012 | Tian | G06T 5/005 382/154 |
| 2015/0261003 A1* | 9/2015 | Morifuji | G09G 3/003 345/8 |

FOREIGN PATENT DOCUMENTS

WO  WO 2013/049130 A1 * 4/2013 ............. H04N 13/00

* cited by examiner

*Primary Examiner* — Vikkram Bali
(74) *Attorney, Agent, or Firm* — IPLA P.A.; James E. Bame

(57) ABSTRACT

Provided is a disparity correcting device which rapidly corrects disparity information generated on the basis of a left image and disparity information generated on the basis of a right image through a simple configuration, and a method thereof, in stereo vision which generates a 3-dimensional image using a left image and a right image captured from left and right cameras.

19 Claims, 9 Drawing Sheets

FIG. 9

| SEQUENCE | LEFT IMAGE BASED DISPARITY VALUE | ERROR | VALID VALUE | TEMPORARY DISPARITY STORING UNIT #1 | TEMPORARY DISPARITY STORING UNIT #2 | TEMPORARY DISPARITY STORING UNIT #3 | TEMPORARY DISPARITY STORING UNIT #4 | OUTPUT VALUE |
|---|---|---|---|---|---|---|---|---|
| 1 | 1 | 1 | 3 | {1,3} | {0,0} | {0,0} | {0,0} | |
| 2 | 2 | 1 | 3 | {1,3} | {1,3} | {0,0} | {0,0} | |
| 3 | 2 | 0 | 2 | {0,2} | {0,2} | {0,2} | {0,0} | |
| 4 | 1 | 0 | 1 | {0,1} | {0,2} | {0,2} | {0,2} | |
| 5 | 1 | 0 | 1 | {0,1} | {0,1} | {0,2} | {0,2} | 2 |
| 6 | 1 | 1 | 1 | {1,1} | {0,1} | {0,1} | {0,2} | 2 |
| 7 | 3 | 1 | 1 | {1,1} | {1,1} | {0,1} | {0,1} | 2 |
| 8 | 3 | 1 | 1 | {1,1} | {1,1} | {1,1} | {0,1} | 1 |
| 9 | 0 | 0 | 0 | {0,0} | {0,0} | {0,0} | {0,0} | - |
| 10 | 0 | 1 | 0 | {1,0} | {0,0} | {0,0} | {0,0} | 0 |
| 11 | 1 | 0 | 1 | {0,1} | {0,1} | {0,0} | {0,0} | 0 |
| 12 | 2 | 1 | 1 | {1,1} | {0,1} | {0,1} | {0,0} | 0 |
| 13 | 1 | 1 | 1 | {1,1} | {1,1} | {0,1} | {0,1} | 0 |
| 14 | 2 | 0 | 2 | {0,2} | {0,1} | {0,1} | {0,1} | 1 |
| 15 | 0 | 0 | 0 | {0,0} | {0,2} | {0,1} | {0,1} | 1 |

DISPARITY CORRECTING DEVICE IN STEREO VISION AND METHOD THEREOF

CROSS REFERENCE

The present application claims the benefit of Korean Patent Application No. 10-2014-0180879 filed in the Korean Intellectual Property Office on 16 Dec. 2014, the entire contents of which are incorporated herein by reference.

BACKGROUND OF THE INVENTION

1. Field of the Invention

The present invention relates to a disparity correcting device which rapidly corrects disparity information generated on the basis of a left image and disparity information generated on the basis of a right image through a simple configuration, and a method thereof, in stereo vision which generates a 3-dimensional image using a left image and a right image captured from left and right cameras.

2. Description of the Related Art

Stereo vision is a technique of acquiring 3-dimensional information from 2-dimensional images acquired at positions different from each other at the same time using two image sensors, that is, a left camera and a right camera, and is configured to acquire depth information that is 3-dimensional distance information by finding corresponding points which correspond to the same point in the left and right images and acquiring disparity information between the two corresponding points.

FIG. 1 illustrates a disparity map based on a left image and a disparity map based on a right image in stereo vision. According to FIG. 1, a corresponding point of a right image with respect to a point A of a left image is A', and there is a difference of 4 pixels in an x axis (a transverse direction). That is, in the left image based disparity map, coordinates about the pixel A are (14, 7), and the depth information at this position is 4. In the right image based disparity map, coordinates about the pixel A' are (10, 7), and a disparity value at this position is 4. In this case, the corresponding points A and A' of the left and right images have a coordinate difference in the x axis by a value of the depth information, that is, by 4 pixels according to an embodiment of FIG. 1. In addition, the corresponding point of the right image with respect to the point B of the left image is B', coordinates about the pixel B in the left image based disparity map are (5, 4), coordinates about the pixel B' in the right image based disparity map are (3, 4), the corresponding points B and B' of the left and right images have a difference in coordinates in the x axis by 2 pixels, and depth information is calculated through disparity between such right image and left image.

However, generally, the left image based disparity information and the right image based disparity information generated in stereo vision have a lot of errors due to internal or external factors such as various distortion variables and parameters. A post-process is performed to correct such errors, currently a post-process most widely used in general, that is, a disparity correcting method is a left/right (L/R) cross check method.

FIG. 2 to FIG. 4 are diagrams for explaining the disparity correcting method through left/right cross check in conventional stereo vision.

FIG. 2 is a diagram exemplifying a case where an error occurs in a matching result in a left image disparity map based and a right image based disparity map in stereo matching, FIG. 3 is a diagram for explaining an error detecting method occurring in FIG. 2, and FIG. 4 is a diagram for explaining a correcting method for the error detected in FIG. 3.

That is, FIG. 2 illustrates that an error occurs in a disparity value about a point C in a left image based disparity map and an error occurs in a disparity value about a point D in a right image based disparity map.

In addition, FIG. 3 illustrates a method of detecting an error through the left/right (L/R) cross check in FIG. 2. That is, on the basis of the left image disparity map in FIG. 3, the disparity value of the point C having coordinates (10, 6) in the left image disparity map is 4, and thus the point C' having coordinates (6, 6) moved to the left by 4 from the point having coordinates (10, 6) of the right image based disparity map is a point to be compared in value with the point C of the left image. In this case, since the disparity value of the point C' is 2 and is not equal to the disparity value of 4 of the point C, it is determined that an error occurs.

FIG. 4 illustrates a method of correcting an error of the point C detected through the left/right cross check in FIG. 3. FIG. 3 illustrates an error state confirmed through the example of FIG. 2. In this case, when the error value is "1", it means that an error occurs in the pixel, and when the error value is "0", it means that an error does not occur in the pixel. A small value of the disparity values of the closest pixel in which an error does not occur is transmitted to the pixel in which an error occurs, thereby performing correction. According to FIG. 4, occurrence of an error is confirmed while moving from the left to the right of the image. When the error does not occur, a valid value is updated, and when the error occurs, the valid value is updated to the previous valid value. After the updating is completed which moving from the left to the right of the image, the same process is repeated which moving from the right to the left of the image. When moving from the right to the left of the image, a valid value to be transmitted from the right in the correction process of the point where the error occurs is compared in largeness and smallness with a valid value (a value corrected while moving from the left to the right) of the current position, it is updated to the small value. For example, the pixel where the error occurs in FIG. 4 is the point C of coordinates (10, 6), the correction of the point is updated to disparity of 2 of coordinates (9, 6) in the course of correcting while moving from the left to the right of the image, the correction is performed while moving from the left to the right in the course of correcting while moving from right to the left of the image, and thus the correction is not performed. In addition, the point D of coordinates (13, 9) is corrected to a valid value of 0 of the previous point transmitted from the right. That is, the left image based disparity map and the right image based disparity map are updated as shown in FIG. 4.

However, the left/right cross check method described above is configured to perform a disparity correcting process for each pixel while moving from the left to the right with respect to one line in stereo vision and to perform the disparity correcting process for each pixel again while moving from the right to the left, and there is a problem that a lot of time is required according to the correction process and a cost of a device in a hardware configuration is increased.

SUMMARY OF THE INVENTION

The present invention has been made in consideration of situations described above, and a technical object of the invention is to provide a disparity correcting device and method in stereo vision capable of obtaining the same correction result as the related art while minimizing a disparity correction time with a simple hardware configuration, by being configured to optimize a function of correcting while moving from the right to the left of an image through a process of correcting while moving from the left to the right of an image.

According to an aspect of the invention to achieve the object described above, there is provided a disparity correcting device in stereo vision which outputs a final error-corrected disparity value with respect to left image based disparity information and right image based disparity information, including: left image based disparity storing means for sequentially outputting a left image based disparity value; right image based disparity storing means for outputting a disparity value of a right image based pixel corresponding to a left image based pixel output from the left image based disparity storing means; a first comparator that compares the left image based disparity value and the right image based disparity value applied from the left image based disparity storing means and the right image based disparity storing means and outputs error occurrence or error nonoccurrence information according to coincidence or not; valid value storing means for setting the left image based disparity value or a previous valid value to a current valid value according to error state information provided from the first comparator; a second comparator that compares the previous valid value provided from the valid value storing means and the left image based disparity value provided from the left image based disparity storing means and outputs one value of them as a correction disparity value according to a preset mode; and a valid information setting unit that sequentially couples a plurality of temporary disparity storing units in which valid information including temporary disparity values is stored, and includes a valid information setting unit storing the valid information in the temporary disparity storing units, wherein the valid information setting unit stores the current valid value provided from the valid value storing means in the first temporary disparity storing unit, sets the temporary disparity value stored in the last temporary disparity storing unit to be output as a final disparity value by shifting the valid information stored in the first temporary disparity storing unit, and changes and sets one of the correction disparity value or the valid value provided from the second comparator to the temporary disparity value of the other temporary disparity storing unit except for the first temporary disparity storing unit on the basis of the error state information and the valid value provided from the first comparator.

Also, the right image based disparity storing means includes N right image based disparity storing units and the right image based disparity value are sequentially stored in the right image based disparity storing units, respectively, Also, the disparity correcting device in stereo vision further includes a multiplexer that calculates a right image based pixel value corresponding to the left image based pixel value provided from the left image based disparity storing means.

Also, "N" determining the number of right image based disparity storing units is a maximum disparity search range value set in the stereo vision.

Also, the valid value storing means sets the valid value for the first pixel to "N−1".

Also, the valid value storing means sets the left image based disparity value to the current valid value when the error nonoccurrence information is applied from the first comparator.

Also, the second comparator outputs a small value between the previous valid value and the left image based disparity value.

Also, the number of temporary disparity storing units is set to a number smaller than the number of transverse pixels of an image.

Also, the valid information stored in the temporary disparity storing unit includes error state information and a temporary disparity value.

Also, the valid information setting unit changes and sets the error state information of all the temporary disparity storing units to an error nonoccurrence state when the error nonoccurrence information is applied from the first comparator.

Also, the valid information setting unit changes and sets the correction disparity value provided from the second comparator to the temporary disparity value of the other temporary disparity storing unit except for the first temporary disparity storing unit when the error nonoccurrence information is applied from the first comparator and the previous error state is the error occurrence state.

Also, the valid information setting unit stores the valid value provided from the valid value storing means in the first temporary storing unit and shifts the valid information, when the error occurrence information is applied from the first comparator.

According to another aspect of the invention to achieve the object described above, there is provided a disparity correcting method performed in a disparity correcting device in stereo vision which outputs a final error-corrected disparity value with respect to left image based disparity information and right image based disparity information generated for an image captured by a stereo camera, including: a first step of outputting a left image based disparity value and a disparity value of a right image based pixel corresponding to a left image based pixel; a second step of sequentially outputting a right image based disparity value of a right image based pixel corresponding to the left image based pixel value; a third step of comparing the left image based disparity value and the right image based disparity value and outputting error occurrence or error nonoccurrence information according to coincidence or not; a fourth step of setting the left image based disparity value or a previous valid value to a current valid value according to the error state information output in the third step; a fifth step of comparing the previous valid value provided in the fourth step and the left image based disparity value output in the first step and outputting a value of them corresponding to a preset mode as a disparity value; and a sixth step of storing, in a first temporary disparity information unit, valid information including the current valid value set in the fourth step, outputting a temporary disparity value stored in the last temporary disparity storing unit, as a final disparity value, by shifting the valid information with respect to a plurality of temporary disparity storing units sequentially coupled with the first temporary disparity storing unit, and changing and setting one of the correction disparity value output in the fifth step and the valid value in the fourth step to the temporary disparity value of the other temporary disparity storing unit except for the first temporary disparity storing unit on the basis of the error state information output in the third step and the valid value provided in the fourth step.

Also, in the second step, the right image based disparity values corresponding to the pixel values are sequentially stored in N right image based disparity storing units, and wherein a right image based pixel value corresponding to the left image based pixel value provided in the first step is calculated, and then the right image based disparity value stored in the right image based disparity storing unit corresponding to the right image based pixel value.

Also, in the third step, the left image based disparity value is set to the current valid value when the error nonoccurrence information is applied in the third step.

Also, in the fourth step, a small value between the previous valid value and the left image based disparity value is output as the correction disparity value.

Also, in the sixth step, the valid information stored in the temporary disparity storing unit includes error state information and a temporary disparity value.

Also, in the six step, the error state information of all the temporary disparity storing units is changed and set to the error nonoccurrence state when the error nonoccurrence information is applied in the second step.

Also, in the sixth step, the correction disparity value provided in the fifth step is changed and set to the temporary disparity value of the other temporary disparity storing unit except for the first temporary disparity storing unit, when the error nonoccurrence information is applied in the second step and the previous error state is the error occurrence state.

Also, in the sixth step, when the error occurrence information is applied in the second step, the valid value provided in the third step is stored in the first temporary disparity storing unit and the valid information of all the disparity storing units is shifted.

BRIEF DESCRIPTION OF THE DRAWINGS

The above and other objects, features and advantages of the present invention will be more apparent from the following detailed description taken in conjunction with the accompanying drawings, in which:

FIG. 9 is a flowchart for explaining a disparity correcting method in stereo vision according to the invention.

DETAILED DESCRIPTION OF THE PREFERRED EMBODIMENT

Hereinafter, a preferred embodiment of the invention will be described in detail with reference to the accompanying drawings.

First, a disparity correcting device in stereo vision according to the invention is to perform a disparity correction process generated in a left image based disparity map and a right image based disparity map, after the left image based disparity map and the right image based disparity map are generated through a stereo camera.

Figure 5:
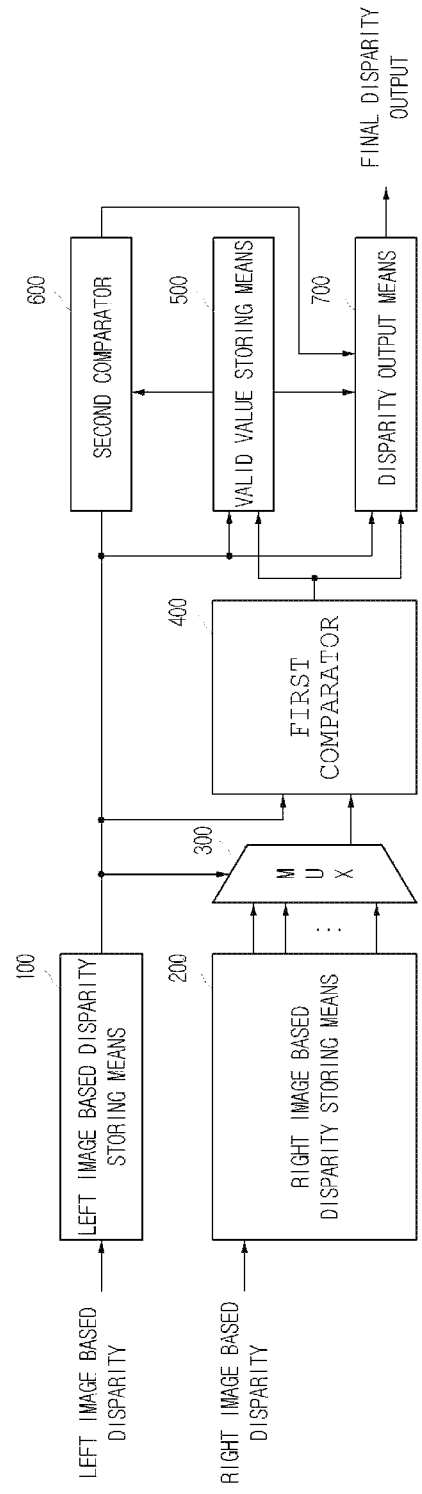
FIG. 5 is a block configuration diagram illustrating a functionally divided internal configuration of a disparity correcting device in the stereo vision according to a first embodiment of the invention.

FIG. 5 is a block configuration diagram illustrating a functionally divided internal configuration of a disparity correcting device in stereo vision according to a first embodiment of the invention.

As shown in FIG. 5, the disparity correcting device in the stereo vision according to the invention includes left image based disparity storing means 100, right image based disparity storing means 200, a multiplexer (MUX) 300, a first comparator 400, valid value storing means 500, a second comparator 600, and disparity output means 700.

Preferably, the left image based disparity storing means 100 stores an input left image based disparity value for each pixel, and outputs the left image based disparity value in pixel units.

Figure 1:
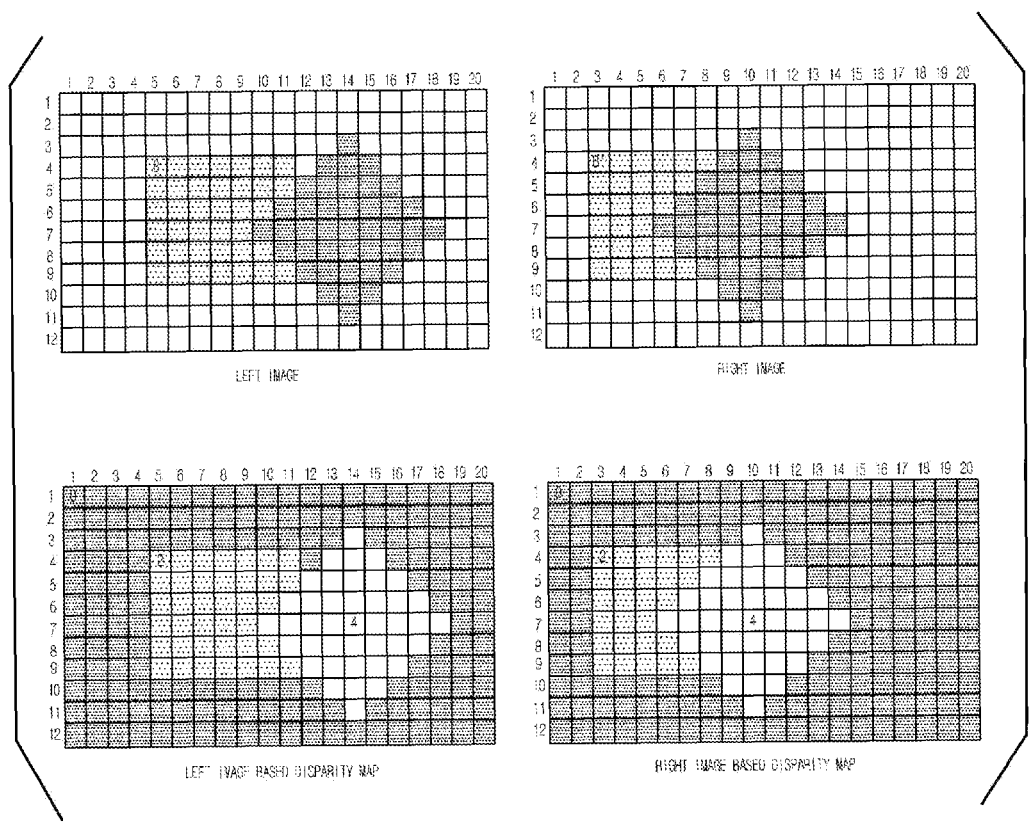
FIG. 1 is a diagram exemplifying a left image based disparity map and a right image based disparity map in stereo vision.
Figure 2:
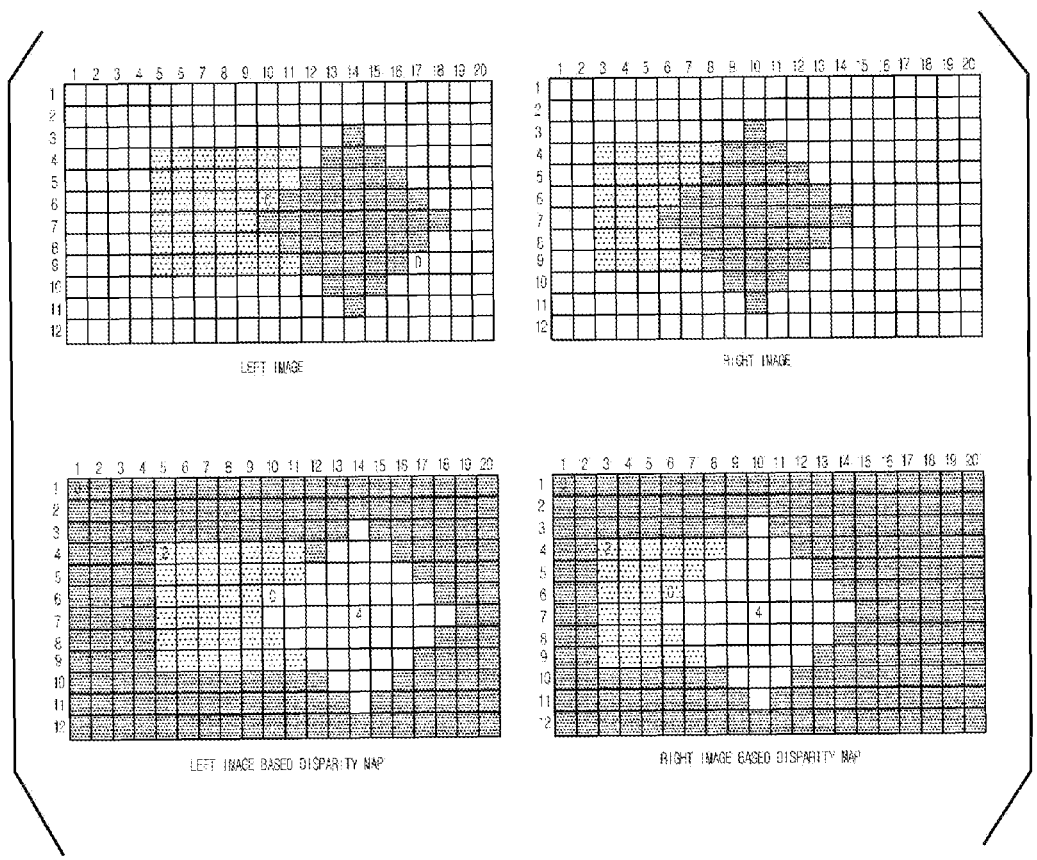
FIG. 2 is a diagram exemplifying an error occurrence state in the left image based disparity map and the right image based disparity map in the stereo vision.
Figure 3:
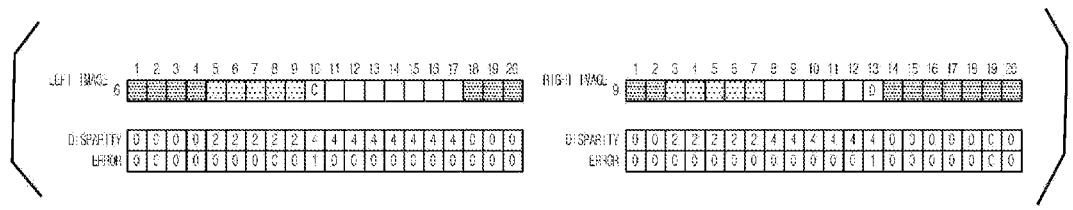
FIG. 3 is a diagram for explaining a method of detecting an error through a left/right cross check in the example of FIG. 2.
Figure 4:
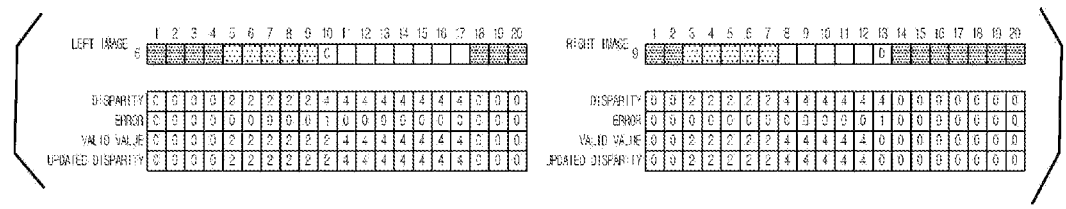
FIG. 4 is a diagram for explaining a method of correcting the error detected in FIG. 3.
Figure 6:
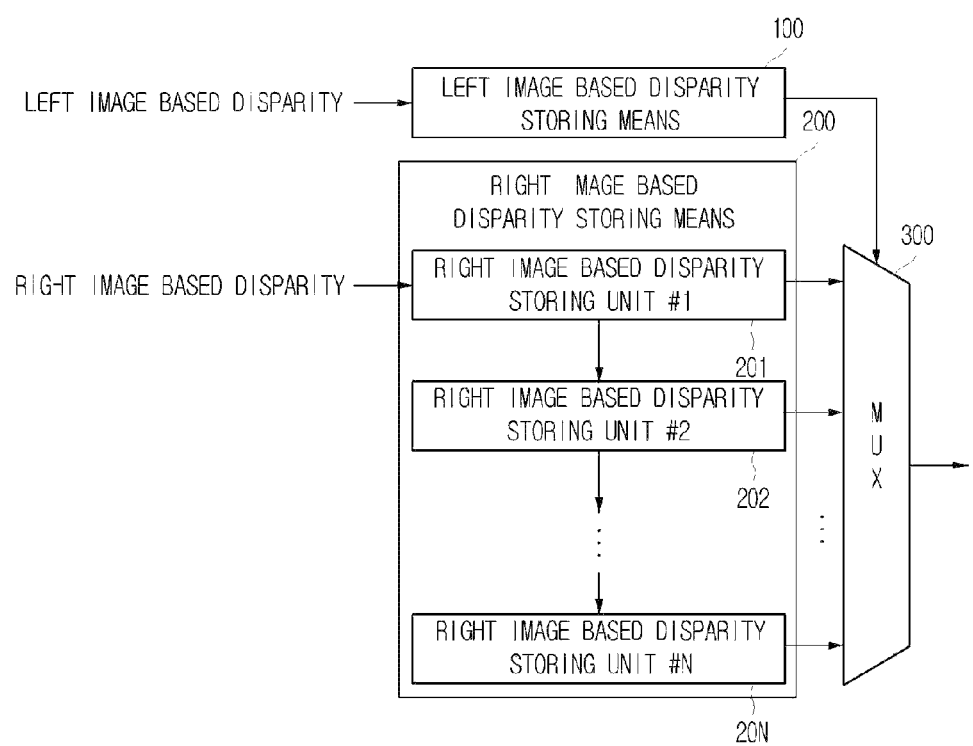
FIG. 6 is a diagram illustrating a main part configuration including an internal configuration of a left image based storing means 200 shown in FIG. 5.

The right image based disparity storing means 200 outputs a disparity value of a right image based pixel corresponding to a left image based pixel. In this case, the right image based disparity storing means 200 includes N right image based disparity storing units (201 to 20N) as shown in FIG. 6. Herein, the N is a maximum disparity search range value set in the stereo vision, and each of the right image based disparity storing units 201 to 20N is configured to sequentially store right image based disparity values according to pixel sequence. For example, in FIG. 2 to FIG. 4, the maximum disparity search range value N is set to "4". In this case, the right image based disparity storing means 200 includes four right image based disparity storing units 201 to 204, and as for each of the disparity storing units 201 to 204, the disparity values corresponding to the right image based pixel values are sequentially stored in the disparity storing units 201 to 204. For example, when the right image based pixel value is "6", the disparity value is stored in the third right image based disparity storing unit 203.

The multiplexer 300 selectively outputs a right image based disparity value corresponding to a left image based pixel provided from the left image based disparity storing means 100, and provides it to the first comparator 400. For example, when the left image pixel value and disparity value are (10, 4) in FIG. 2, the multiplexer 300 outputs a disparity value corresponding to the pixel value "6" stored in the third right image based disparity storing unit 203 in which the pixel value "6" is stored through an operation of "10-4" by the right image pixel value corresponding to the left image pixel position.

The first comparator 400 compares the left image based disparity value provided from the left image based disparity storing means 100 with the right image based disparity value provided from the multiplexer 300, and provides error state information according to the comparison result to the valid value storing means 500 and the output means 700. In this case, the first comparator 400 outputs information "1" corresponding to an error occurrence state when the left image based disparity value is different from the right image based disparity value, and outputs information "0" corresponding to an error nonoccurrence state when the left image based disparity value is equal to the right image based disparity value.

When the error nonoccurrence state information "0" is input from the first comparator 400, the valid value storing means 500 stores, as a valid value, the left image based disparity value provided from the left image based disparity storing means 100. In addition, when the error occurrence state information "1" is input from the first comparator 400, the valid value storing means 500 stores, as a current valid value, the previous valid value. In addition, the valid value storing means 500 provides the valid value to the disparity output means 700 and the second comparator 600.

The second comparator 600 compares the valid value provided from the valid value storing means 500 with the left image based disparity value applied from the left image based disparity storing means 100, and provides one of them as a correction disparity value to the disparity output means 700 according to a preset mode. Preferably, the second comparator provides a small value between the valid value and the left image based disparity value to the disparity output means 700.

Figure 7:
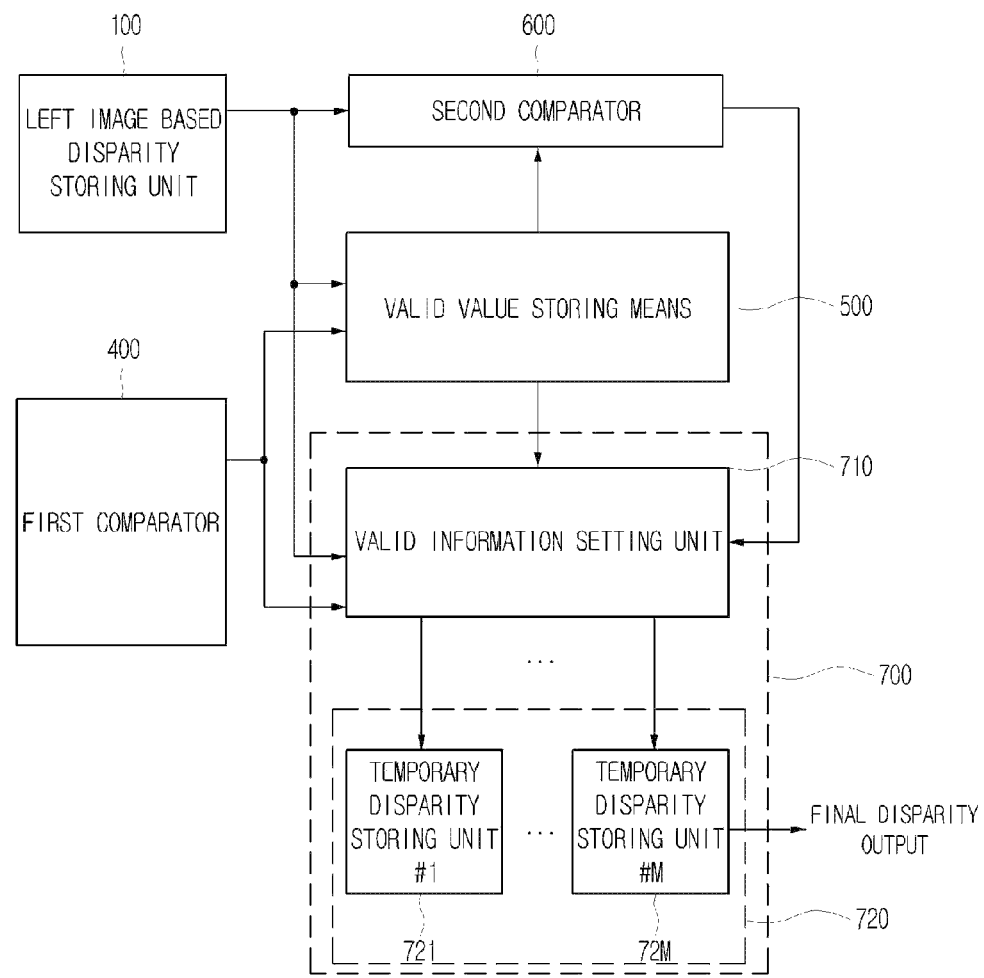
FIG. 7 is a diagram illustrating a main part configuration including an internal configuration of a disparity output means 700 shown in FIG. 5.

As shown in FIG. 7, the disparity output means 700 includes a valid information setting unit 710 and a plurality of temporary disparity storing units 720 and 721 to 72M. In this case, the "M" is set to a value smaller than the number of transverse pixels of an image. This means that it is possible to correct the disparity of the pixel in which an error occurs up to M, and it may be appropriately set to be variable in consideration of the number of pixels of an image or the like.

Herein, the valid value setting unit 710 stores the current valid value provided from the valid value storing means 500 in the first temporary disparity storing unit 721, and outputs the temporary disparity value stored in the last temporary disparity storing unit 72M as a final disparity value by shifting the valid information stored in the first temporary disparity storing unit 721, that is, the error state and the temporary disparity value. In this case, in FIG. 7, the temporary disparity storing unit 720 includes an error state storing area and a temporary disparity value storing area, and the plurality of temporary disparity storing units 720 are sequentially coupled. Accordingly, whenever the pixel information is input to the first temporary disparity storing unit 721, the error state information and the disparity value information are shifted and output from the temporary disparity storing unit 720 to the next-stage temporary disparity storing unit 720, and the disparity value stored in the last M-th temporary disparity storing unit 72M is finally output.

In addition, the valid information setting unit 710 changes and sets one of the correction value and the valid value provided from the second comparator 600 to the temporary disparity value of the other temporary disparity storing units 722 to 72M except for the first temporary disparity storing unit 721 on the basis of the error state information provided from the first comparator 400 and the valid value provided from the valid value storing means 500.

That is, the valid information setting unit 710 confirms the error state information about the previous pixel when the error nonoccurrence state information "0" about the current pixel is applied from the first comparator 400, and sets the correction disparity value provided from the second comparator 600, to the temporary disparity value of the other temporary disparity storing units 722 to 72M except for the first temporary disparity storing unit 721 when the previous error state is the error occurrence state information "1". In addition, in a state where the error nonoccurrence state information "0" about the current pixel is applied and the error state information about the previous pixel is the error occurrence state information "1", the valid information setting unit 710 sets the temporary disparity value shifted from the previous temporary disparity storing unit 720 to be kept as it is when the current pixel valid value is larger than the previous pixel valid value.

Figure 8:
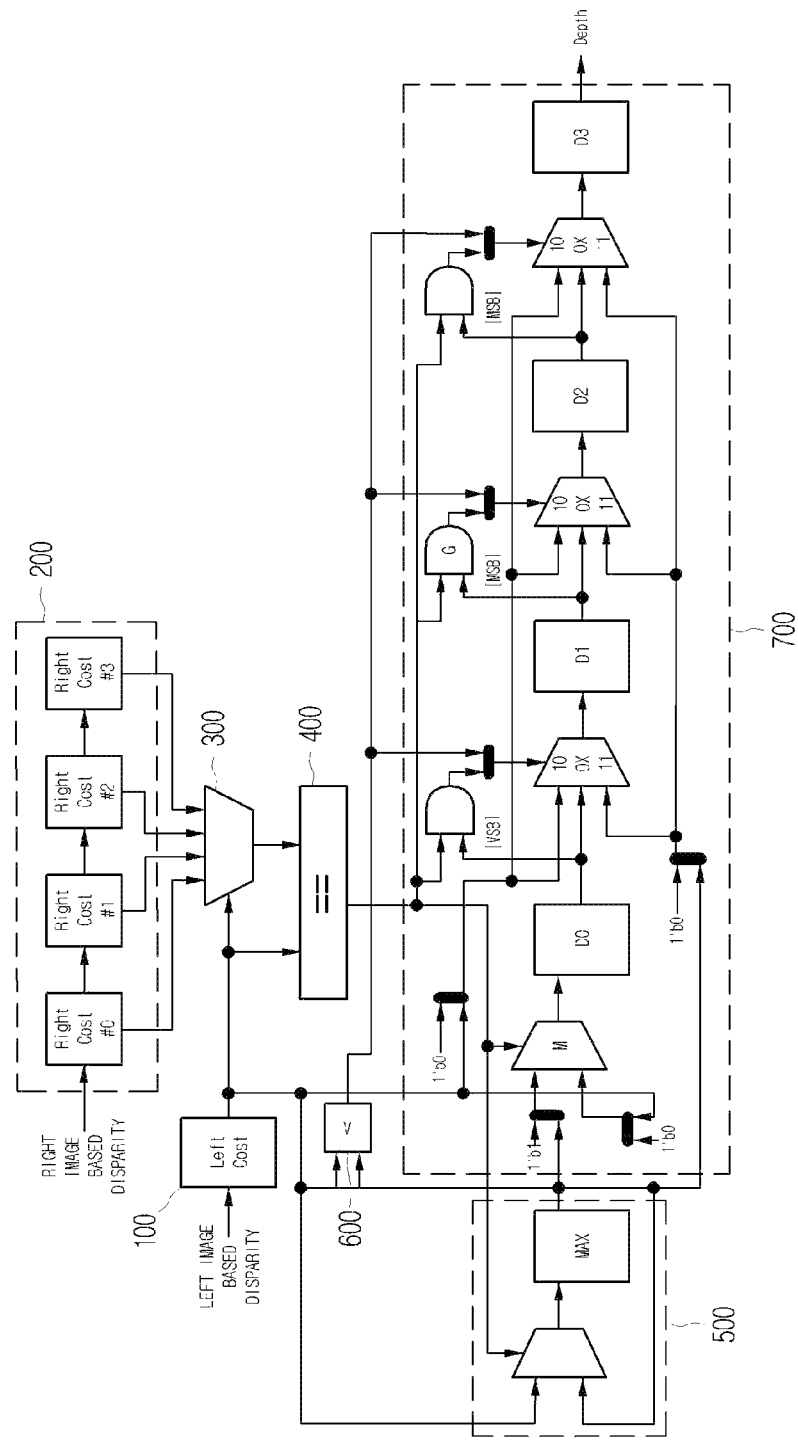
FIG. 8 is a diagram exemplifying a circuit diagram embodying the disparity correcting device in the stereo vision shown in FIG. 5 to FIG. 7, with FPGA.

Meanwhile, the disparity correcting device in the stereo vision described above may be embodied in a form of FPGA based on hardware, and FIG. 8 is a diagram exemplifying a circuit configuration embodying the disparity correcting device shown in FIG. 5 to FIG. 7 with FPGA. As shown in FIG. 8, the valid value storing means 500 is embodied by a multiplexer M and a memory MAX, and the disparity output means 700 may be embodied by combination of a plurality of multiplexers M, gate elements G, and flip-flops D. In this case, the disparity output means 700 includes a temporary disparity storing unit 720 including a plurality of flip-flops D, D0, D1, D2, and D3, and a valid information setting unit 710 including a plurality of AND gates G and a plurality of multiplexers M.

Subsequently, a disparity correcting method of the disparity correcting device in the stereo vision with the configuration described above will be described with reference to FIG. 9 and FIG. 10. Herein, FIG. 9 is a flowchart illustrating a disparity correcting method in stereo vision, and FIG. 10 is a diagram exemplifying a left image disparity according to pixel sequence generated at the time of disparity correction according to the invention, a valid value according to an error state, a plurality of temporary disparity values, and an output disparity value.

Figure 10:
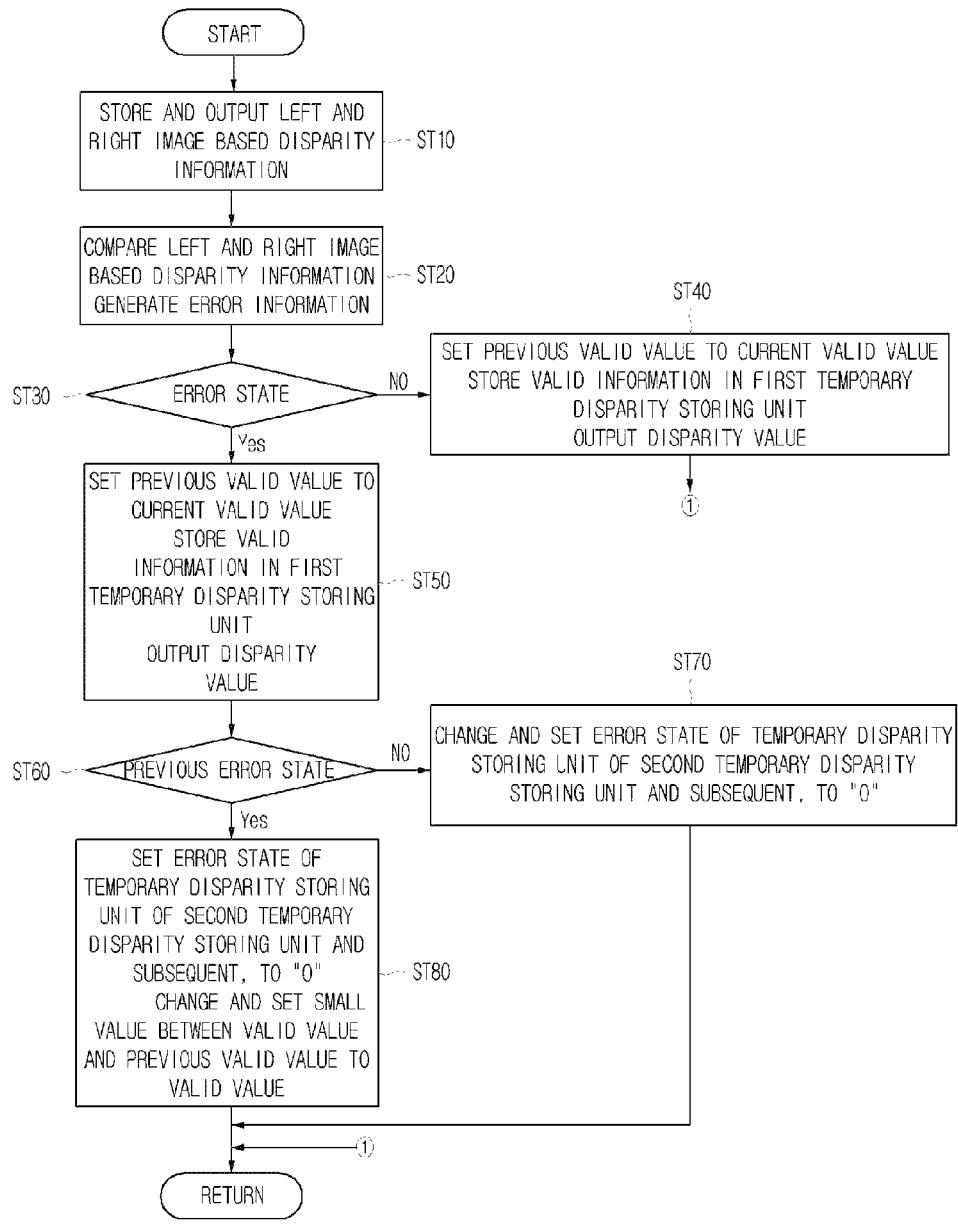
FIG. 10 is a diagram exemplifying output values according to the disparity correcting method in the stereo vision shown in FIG. 9.

First, FIG. 10 is a diagram exemplifying values of a state where both of a value N for determining the number of second disparity storing units 201 to 20N and a value M for determining the number of a plurality of temporary disparity storing units 721 to 72M are set to "4". In addition, the valid value storing means 500 sets the first valid value to "N−1", that is, "3".

In the state described above, the right image based disparity information and the left image based disparity information are sequentially input to the right image based disparity storing means 200 and the left image based disparity storing means 100, and are stored and output (ST10). In this case, the left image based disparity storing means 100 provides the left image based disparity information to each of the multiplexer 300, the first comparator 400, the valid value storing means 500, and the disparity output means 700. In addition, the right image based disparity values are sequentially stored in the right image based disparity storing units 201 to 204, respectively, and the multiplexer 300 selects the right image based disparity value from the right image based storing unit corresponding to the right image based pixel value on the basis of the left image based disparity information, and outputs the right image based disparity value to the first comparator 400.

The first comparator 400 compares the left image based disparity value applied from the left image based disparity storing means 100 in the step ST10 with the right image based disparity value output from the multiplexer 300, and outputs error state information generated on the basis of coincidence or not (ST20). In this case, the first comparator 400 outputs the error nonoccurrence information "0" when the left image based disparity value is equal to the right image based disparity value, and outputs the error occurrence information "1" when the left image based disparity value is not equal to the right image based disparity value.

The error state information output from the first comparator 400 is provided to each of the valid value storing means 500 and the disparity output means 700.

In this case, the valid value storing means 500 confirms the error state information from the first comparator 400. That is, the valid value storing means 500 confirms whether the error nonoccurrence information "0" is received (ST30).

When the error occurrence state, that is, the value "1" is received in the step ST30, the valid value storing means 500 sets the previous valid value to a valid value about the current pixel, and provides the valid value to the valid information setting unit 710.

The valid information setting unit 710 stores the error occurrence information "1" provided from the first comparator 400 and the valid value provided from the valid value setting unit 710, as the error state of the first temporary disparity storing unit 721 and the temporary disparity value. In this case, the error state and the temporary disparity value corresponding to the previous pixel stored in the first temporary disparity storing unit 721 is shifted to the second temporary disparity storing unit 722. That is, the error state and the temporary disparity value of all the temporary disparity storing units are shifted, and the temporary disparity value stored in the last temporary disparity storing unit, that is, the fourth temporary disparity storing unit 724 is output as the final disparity value (ST40). For example, in FIG. 9, as in the pixel sequence 7, when the left image based disparity value is "3" and the error state value is "1", the valid value is set to the valid value "1" in the previous pixel sequence 6, and thus the first temporary disparity storing unit 701 is set to {error state, temporary disparity value}={1, 1}. The error state and the temporary disparity value in the previous pixel sequence 6 are shifted according to the determination of the valid information setting unit 710 and are stored in the second to fourth disparity storing units 702, 703, and 704, and the temporary disparity value "2" stored in the fourth temporary disparity storing unit 724 is output as the final disparity value.

Meanwhile, in the step ST30, when it is determined that the error nonoccurrence state, that is, the value "0" is received from the first comparator 400, the valid value storing means 500 sets the left image based disparity value to the current valid value. In addition, the valid information setting unit 710 stores the error state and the current valid value in the first temporary disparity storing unit 721, shifts the error state and the temporary disparity value stored in each of the temporary disparity storing units 721 to 724, and outputs the final disparity value (ST50).

In addition, only when the current error nonoccurrence state "0" is input in the step ST30, the valid information setting unit 710 confirms the previous error state provided from the first comparator 400 (ST60).

In this case, when the previous error state is the error occurrence state "0" in the step ST60, the valid information setting unit 710 changes the error states of the other temporary disparity storing units 722 to 724 except for the first temporary disparity storing unit 721 to "0", and sets to keep the shifted previous temporary disparity value (ST70). For example, as shown in the pixel sequence 5 in FIG. 10, when the left image based disparity value is "1" and the error state value is "0", the valid value is set to the left image based disparity value "1", and the first temporary disparity storing unit 721 is set to {error state, temporary disparity value}={0, 2}. the valid information setting unit 710 shifts the error state and the temporary disparity value in the previous pixel sequence 4 to be stored in the second to fourth temporary disparity storing units 722, 723, and 724. Accordingly, the temporary disparity value "2" of the fourth temporary disparity storing unit 724 in the pixel sequence 4 is output as the final disparity value.

Meanwhile, when the previous error state is the error nonoccurrence state "1" in step ST60, the valid information setting unit 710 changes the error states of the other temporary disparity storing units 722 to 724 except for the first temporary disparity storing unit 721 TO "0", and changes and sets the correction disparity value applied from the second comparator 600 (ST80). For example, as shown in the pixel sequence 14 in FIG. 10, when the left image based disparity value "2" and the error state is "0", the valid value is set to "2" that is the left image based disparity value, and thus the first temporary disparity storing unit 7001 is set to {error state, temporary disparity value}={0, 2}. In addition, the error state in the previous pixel sequence 13 is "1", the valid value in the previous pixel sequence 13 is "1" and is smaller than the valid value "2" in the current pixel sequence 14. Accordingly, the temporary disparity values of the second to fourth disparity storing units 722, 723, and 724 are set to the valid value "1" that is a smaller value, and the valid information setting unit 710 allows {error state, temporary disparity value} to be set to {0, 1}, {0, 1}, and {0, 1}. In addition, in FIG. 10, in the pixel sequence 3 and the pixel sequence 9, the error state in the previous pixel sequence is "1" and the current pixel valid value is smaller than the previous pixel valid value. Accordingly, the valid information setting unit 710 keeps, as it is, the previous temporary disparity value obtained by shifting the temporary disparity values of the second to fourth temporary disparity storing units 722, 723, and 724.

In this case, for the pixel corresponding to the last part about one image frame, the valid values stored in the temporary disparity storing unit 720 are sequentially shifted and the output disparity values are output by the number corresponding to one image frame. Accordingly, the disparity correction process for one image frame is completed. For example, in FIG. 10, when the pixel sequence 15 is the correction value about the last pixel based on the left image, the temporary disparity values stored in the fourth temporary disparity storing unit 724, the third temporary disparity storing unit 723, the second temporary disparity storing unit 722, and the first temporary disparity storing unit 721 are sequentially output. That is, "1→1→2→0" is sequentially output as the final disparity value, and the disparity correction process for one image frame is completed.

That is, according to the embodiment, the left image based disparity value and the right image based disparity value are compared to determine whether or not an error occurs, the valid value is set according to whether or not the error occurs, the error state information and temporary disparity value corresponding to at least two pixels are temporarily stored on the basis of whether or not the error occurs and the valid value, the temporary disparity value is changed and set through comparison between the previous error state and the previous valid value to shift the temporary disparity value, and thus the final disparity value is automatically output.

Therefore, according to the invention, the correction process is automatically performed through the process of correcting the disparity value while moving from the left to the right, even without performing the process of correcting the disparity value while moving from the right to the left.

According to the invention, by simultaneously performing a process of correcting while moving from the right to the left of an image through a process of correcting while moving from the left to the right of an image with a simple hardware configuration, it is possible to obtain the same correction result as the related art by rapidly performing a disparity correction process.

Although the invention has been described according to the preferred embodiment mentioned above, the invention can be variously changed and modified without deviating from the essential point and scope of the invention. Accordingly, the accompanying Claims include such change and modification belonging to the essential point of the invention.

What is claimed is:

1. A disparity correcting device for outputting a final error-corrected disparity value with respect to left image based disparity information and right image based disparity information, generated for an image captured by a stereo camera, to a stereo vision for generating a three-dimensional image, comprising:
   left image based disparity storing means configured for sequentially outputting a left image based disparity value;
   right image based disparity storing means configured for outputting a disparity value of a right image based pixel corresponding to a left image based pixel output from the left image based disparity storing means;
   a first comparator configured for comparing the left image based disparity value and the right image based disparity value applied from the left image based disparity storing means and the right image based disparity storing means and outputting error occurrence or error nonoccurrence information according to coincidence or not;
   valid value storing means configured for setting the left image based disparity value or a previous valid value to a current valid value according to error state information provided from the first comparator;
   a second comparator configured for comparing the previous valid value provided from the valid value storing means and the left image based disparity value provided from the left image based disparity storing means and outputting one value of them as a correction disparity value according to a preset mode; and
   a valid information setting unit configured for sequentially coupling a plurality of temporary disparity storing units configured for storing valid information comprising temporary disparity values is stored, and comprising a valid information setting unit configured for storing the valid information in the temporary disparity storing units,
   wherein the valid information setting unit stores the current valid value provided from the valid value storing means in a first temporary disparity storing unit, sets the temporary disparity value stored in a last temporary disparity storing unit to be output as a final disparity value by shifting the valid information stored in the first temporary disparity storing unit, and changes and sets one of the correction disparity value or the valid value provided from the second comparator to the temporary disparity value of an other temporary disparity storing unit except for the first temporary disparity storing unit on the basis of the error state information and the valid value provided from the first comparator, and
   wherein the final disparity value is used as the final error-corrected disparity value for generating the three-dimensional image in the stereo vision.

2. The disparity correcting device according to claim 1, wherein the right image based disparity storing means comprises N right image based disparity storing units and the right image based disparity value are sequentially stored in the right image based disparity storing units, respectively, further comprising a multiplexer that calculates a right image based pixel value corresponding to the left image based pixel value provided from the left image based disparity storing means.

3. The disparity correcting device according to claim 2, wherein "N" determining the number of right image based disparity storing units is a maximum disparity search range value set in the stereo vision.

4. The disparity correcting device according to claim 3, wherein the valid value storing means sets the valid value for the first pixel to "N−1".

5. The disparity correcting device according to claim 1, wherein the valid value storing means sets the left image based disparity value to the current valid value when the error nonoccurrence information is applied from the first comparator.

6. The disparity correcting device according to claim 1, wherein the second comparator outputs a small value between the previous valid value and the left image based disparity value.

7. The disparity correcting device according to claim 1, wherein the number of temporary disparity storing units is set to a number smaller than the number of transverse pixels of an image.

8. The disparity correcting device according to claim 1, wherein the valid information stored in the temporary disparity storing unit comprises error state information and a temporary disparity value.

9. The disparity correcting device according to claim 8, wherein the valid information setting unit changes and sets the error state information of all the temporary disparity storing units to an error nonoccurrence state when the error nonoccurrence information is applied from the first comparator.

10. The disparity correcting device according to claim 1, wherein the valid information setting unit changes and sets the correction disparity value provided from the second comparator to the temporary disparity value of the other temporary disparity storing unit except for the first temporary disparity storing unit when the error nonoccurrence information is applied from the first comparator and the previous error state is the error occurrence state.

11. The disparity correcting device according to claim 1, wherein the valid information setting unit stores the valid value provided from the valid value storing means in the first temporary storing unit and shifts the valid information, when the error occurrence information is applied from the first comparator.

12. A disparity correcting method performed in a disparity correcting device for outputting a final error-corrected disparity value with respect to left image based disparity information and right image based disparity information, generated for an image captured by a stereo camera, to a stereo vision for generating a three-dimensional image, comprising:
   a first step of outputting a left image based disparity value and a disparity value of a right image based pixel corresponding to a left image based pixel;
   a second step of sequentially outputting a right image based disparity value of a right image based pixel corresponding to the left image based pixel value;
   a third step of comparing the left image based disparity value and the right image based disparity value and outputting error occurrence or error nonoccurrence information in the second step according to coincidence or not;
   a fourth step of setting information as a correction disparity value by comparing the left image based disparity value that is output in the first step and a previous valid value in the third step as a current valid value according to a preset mode;

a fifth step of comparing the previous valid value provided in the fourth step and the left image based disparity value output in the first step and outputting a value of them corresponding to a preset mode as a disparity value;

a sixth step of storing, in a first temporary disparity information unit, valid information comprising the current valid value set in the fourth step, outputting a temporary disparity value stored in a last temporary disparity storing unit, as a final disparity value, by shifting the valid information with respect to a plurality of temporary disparity storing units sequentially coupled with the first temporary disparity storing unit, and changing and setting one of the correction disparity value output in the fifth step and the valid value in the fourth step to the temporary disparity value of an other temporary disparity storing unit except for the first temporary disparity storing unit on the basis of the error state information output in the third step and the valid value provided in the fourth step; and a seventh step of using the final disparity value as the final error-corrected disparity value for generating the three-dimensional image in the stereo vision.

13. The disparity correcting method according to claim 12, wherein in the second step, the right image based disparity values corresponding to the pixel values are sequentially stored in N right image based disparity storing units, and wherein a right image based pixel value corresponding to the left image based pixel value provided in the first step is calculated, and then the right image based disparity value stored in the right image based disparity storing unit corresponding to the right image based pixel value.

14. The disparity correcting method according to claim 12, wherein in the third step, the left image based disparity value is set to the current valid value when the error nonoccurrence information is applied in the third step.

15. The disparity correcting method according to claim 12, wherein in the fourth step, a small value between the previous valid value and the left image based disparity value is output as the correction disparity value.

16. The disparity correcting method according to claim 12, wherein in the sixth step, the valid information stored in the temporary disparity storing unit comprises error state information and a temporary disparity value.

17. The disparity correcting method according to claim 14, wherein in the six step, the error state information of all the temporary disparity storing units is changed and set to the error nonoccurrence state when the error nonoccurrence information is applied in the second step.

18. The disparity correcting method according to claim 12, wherein in the sixth step, the correction disparity value provided in the fifth step is changed and set to the temporary disparity value of the other temporary disparity storing unit except for the first temporary disparity storing unit, when the error nonoccurrence information is applied in the second step and the previous error state is the error occurrence state.

19. The disparity correcting method according to claim 12, wherein in the sixth step, when the error occurrence information is applied in the second step, the valid value provided in the third step is stored in the first temporary disparity storing unit and the valid information of all the disparity storing units is shifted.

* * * * *